Figure 1:
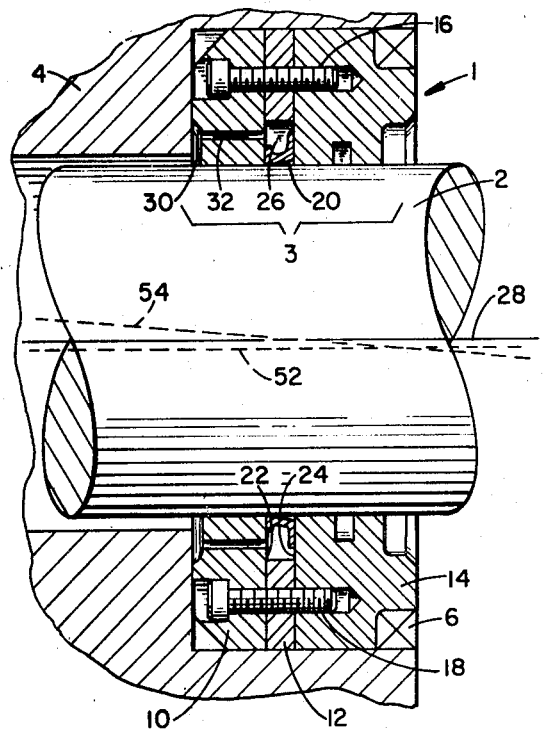

United States Patent
Middelkoop et al.

[15] 3,647,226
[45] Mar. 7, 1972

[54] SEALING CARTRIDGE ASSEMBLY AND RING ELEMENT THEREFOR

[72] Inventors: James H. Middelkoop, Woodland Hills; Edward J. Bigelow, Torrance, both of Calif.

[73] Assignee: North American Rockwell Corporation

[22] Filed: May 7, 1970

[21] Appl. No.: 37,380

Related U.S. Application Data

[63] Continuation of Ser. No. 583,879, Oct. 3, 1966, abandoned.

[52] U.S. Cl. ................................ 277/35, 277/70, 277/206, 277/187
[51] Int. Cl. ........................................ F16j 9/02, F16j 9/20
[58] Field of Search ............ 277/180, 187, 206, 236, 70, 277/71, 72, 35

[56] References Cited

UNITED STATES PATENTS

| | | | |
|---|---|---|---|
| 2,918,340 | 12/1959 | Knoebel | 277/193 |
| 254,736 | 3/1882 | Vantine | 277/206 UX |
| 1,531,242 | 3/1925 | Miller | 277/206 X |
| 2,707,118 | 4/1955 | Swartz | 277/187 X |

FOREIGN PATENTS OR APPLICATIONS

| | | | |
|---|---|---|---|
| 4,188 | 1886 | Great Britain | 277/206 |
| 7,189 | 1891 | Great Britain | 277/187 |
| 568,902 | 4/1945 | Great Britain | 277/187 |

*Primary Examiner*—Samuel B. Rothberg
*Assistant Examiner*—William H. Wright

[57] ABSTRACT

A sealing cartridge assembly is disclosed for use between a cylinder housing and a piston shaft movable relative thereto. The assembly comprises a cartridge removably supported on the cylinder housing and having an annular cavity within which a sealing ring is contained. The stated ring is deformed by forcible contact with the cavity walls, causing the ring to bear against the piston shaft with a different contact area than when in the undeformed state. The ring is radially movable within the cavity to insure continuous sealing contact during conditions of misalignment, out-of-roundness, or bending of the piston shaft.

16 Claims, 12 Drawing Figures

PATENTED MAR 7 1972 3,647,226

SHEET 1 OF 2

INVENTORS
JAMES H. MIDDELKOOP
EDWARD J. BIGELOW

BY
ATTORNEY

SEALING CARTRIDGE ASSEMBLY AND RING ELEMENT THEREFOR

This application is a continuation of Ser. No. 583,879 filed Oct. 3, 1966, now abandoned.

This invention concerns sealing means of a type which may be adapted either for dynamic or static sealing applications, and is especially advantageous in dynamic sealing between piston rods and cylinder ends such as associated with fluid motors.

Although the invention is of wide application in devices used for conversion of fluid pressure to mechanical movement and vice versa, it will be explained for the sake of illustration in connection with high-performance and lightweight actuators as used in modern supersonic aerial and space vehicles or the like.

Actuators of the foregoing type are used extensively in servomechanical systems often requiring a high degree of accuracy and sensitivity to input forces over a wide range of operating pressures and temperatures. In some applications, it may even become necessary for piston and cylinder seals to be individually matched during fabrication thereof to the particular items with which they are installed, in view of the critically severe performance requirements involved. The relative movement of working parts bears a precise predetermined relationship to the amount of pressure applied to the surfaces thereof, such as a piston surface, and the response time of the device with regard to inputs and outputs is very often a prime operational consideration. It is therefore imperative that friction between the rod seals and rod be a minimum and that leakage of working fluid not occur through seals at the ends of cylinders operatively related thereto.

Due to the mentioned complex dynamic and kinematic relationships in actuators of the foregoing type, all possible causes of binding, chattering or unpredictable and nonuniform movement in the design of such devices must be assiduously avoided. For example, the force required to achieve sealing contact between relatively movable and stationary components must not be so great or distributed over such a wide area that excessive wear will result, and must be sufficiently moderate, constant and uniformly distributed that no concentrated or unsymmetrical stresses can produce structural failure in the sealing elements. Moreover, the areas of sealing contact and forces between relatively movable components must not be subject to wide variation between the maximum extremes of operational movement such as may result from nonlinearity and lateral or angular displacement of a piston rod. In addition, a minimum of unsupported structural mass should ideally be achieved in the delicate seal and related elements, to minimize the stress distortion and resultant fatigue which might otherwise be encountered in service use.

Accordingly, it is a principal object of this invention to provide an improved dynamic end seal for high-temperature, high-pressure fluid motors wherein moderate force is required to maintain sealing contact between a piston rod and cylinder end wall, and such force is substantially uniformly distributed throughout the sealing element.

It is a further object in this case to provide improved sealing means as stated in the above object capable of maintaining close sealing contact throughout variations of positions between the two relatively movable elements wherein sealing is accomplished, including lateral and angular displacements of the piston rod and cylinder longitudinal axes.

It is another object in this case to provide sealing means as stated in the above object characterized by relatively less wear and improved reliability with respect to avoidance of fatigue stresses and structural failure.

It is another object in this case to provide sealing means as stated in the above object capable of improved economy of manufacture and adapted for assembly in a sealing unit interchangeable between devices requiring such seals.

Figure 2:
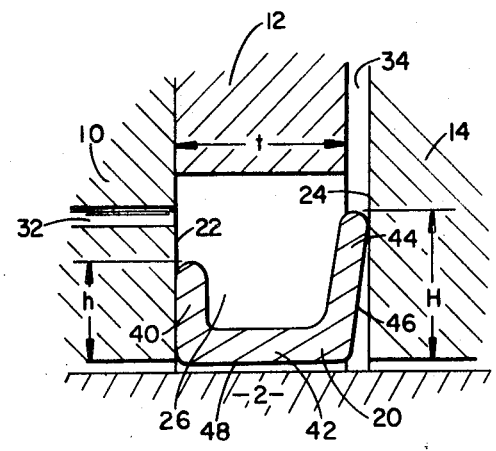
Figure 3:
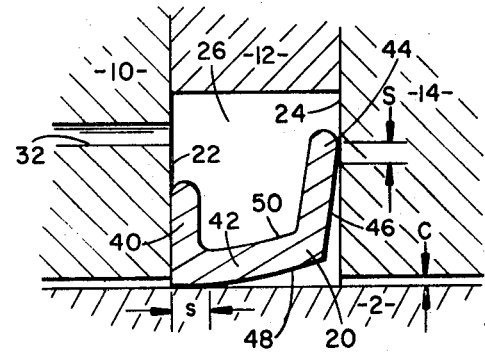
Figure 5:
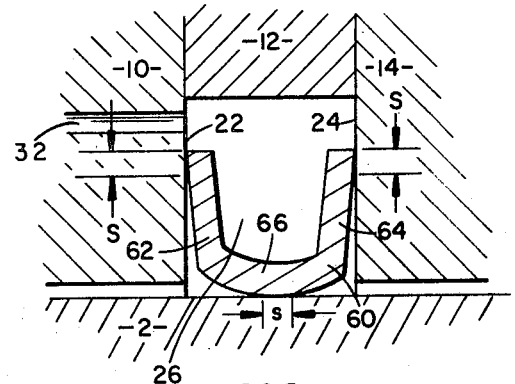
Figure 4:
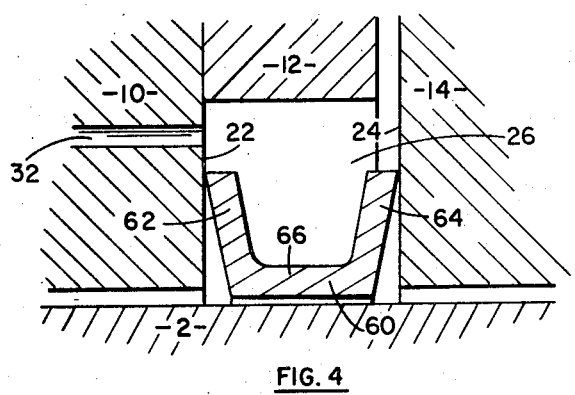
Figure 6:
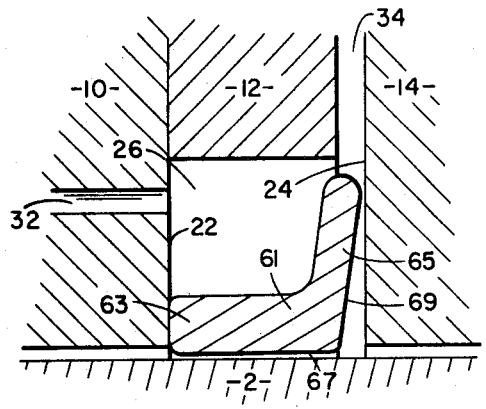
Figure 7:
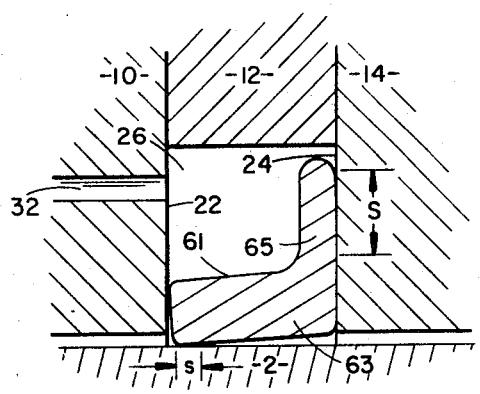

Other important objects and advantages of the instant invention will become apparent upon a close reading of the following detailed explanation of the invention reference being had to accompanying drawings, wherein:

FIG. 1 shows a fragmented view, partly in cross section, through a dynamic seal assembly embodying the inventive principles of this case as applied to a cylinder end having a piston rod passing therethrough and slidably movable longitudinally relative thereto, FIG. 2 shows, in enlarged cross section, the seal detail of FIG. 1, but in the relaxed and nonsealing state, FIG. 3 shows the seal of FIG. 2 in the prestressed and sealing state, FIGS. 4 and 5 correspond with FIGS. 2 and 3 but show a modified seal cross-sectional configuration differing from that shown in FIGS. 1-3, FIGS. 6 and 7 correspond with FIGS. 2 and 3 but show another modified seal cross-sectional configuration differing from those shown in FIGS. 1-5, FIGS. 8 and 9 correspond with FIGS. 2 and 3 but show another modified seal cross-sectional configuration differing from those shown in FIGS. 1-7, FIGS. 10 and 11 correspond with FIGS. 2 and 3 but show another modified seal cross-sectional configuration differing from those shown in FIGS. 1-9, and FIG. 12 shows a further modified seal arrangement in a view corresponding with FIG. 3 but using two seals of the type shown in FIGS. 6 and 7, adapted for a piston seal.

Referring to the drawings described above, and particularly to FIG. 1, it may be seen that the inventive concept in this case includes a sealing assembly generally designated by reference numeral 1 which may illustratively be used as a dynamic seal between a substantially cylindrical shaft 2 and a cylinder end wall 4 stationary relative to shaft 2. Sealing assembly 1 broadly comprises compression means in the form of a cartridge assembly 3 formed by portions 10, 12 and 14 secured together by suitable holding means such as a plurality of screws 16 and 18 or the like, and is adapted to compress and otherwise retain a sealing element 20 in sealing relationship between laterally movable shaft 2 and relatively stationary cartridge assembly 3 shown mounted in cylinder end wall 4. Normally a slight initial interference fit exists between seal element 20 and rod 2. However, the deformation of base portion 42 of seal 20 shown in FIG. 3 causes a decrease of inside diameter of seal 20, whereby proper sealing results even where a slight initial gap exists as shown in FIG. 2. A static seal 6 of convenient form known to the prior art may be used to seal between assembly 3 and end 4. Portion 10 functions as a retainer and has a relatively smooth or polished bearing surface 22 against which a portion of element 20 bears in a manner described in greater detail hereinbelow, and against which a correspondingly smooth surface of portion 12, which functions as a spacer, also bears. Compression member or portion 14 is also provided with a smooth bearing surface 24 against which spacer 12 also bears. The force of holding means which may illustratively take the form of a plurality of circumferentially spaced screws suggested by screws 16, 18 serves to pull together portions 10, 12 and 14, and to hold the same in firm, continuous and substantially leakproof relationship. Although certain advantages are gained by forming spacer 12 as a separate unit, for reasons which will appear more clearly hereinbelow, it will be understood that spacer 12 may be integrally formed on either of portions 10 or 14 rather than separately and releasably secured in the manner described above. Due to the cylindrical shape of shaft 2, seal element 20 and portions 10, 12 and 14 each are similarly round in their general form. The stated relationship of the foregoing members which comprise cartridge assembly 3 surrounding seal element 20 results in an annular cavity 26 formed between the stated portions as shown in FIG. 1. The outer periphery of cavity 26 is defined by the inner periphery of spacer 12, while the width of cavity 26 is defined by the thickness of spacer 12. In the arrangement of structural components shown by FIG. 1, it will be understood that shaft 2 is longitudinally movable in either of two opposite directions defined by line 28 under forces primarily applied to the shaft by a piston (not shown) which may be secured thereto and may be moved by the application of pressure from fluid contained within cylinder 4. In order to aid the sealing effect achieved by element 20, pressure from the working fluid contained within cylinder 4 may be communicated to cavity 26 by appropriate means such as passages 30 and 32, a plurality of which may be circumferentially spaced within the mass comprising retainer portion 10. It will be understood by those skilled in the art that seal element 20 may be used in a wide variety of other housings or structural environments differing from cartridge assembly 10, whereby the seal is of separate significance regarding its novelty apart from the illustrative embodiment shown in FIG. 1 involving cartridge assembly 10.

Referring to FIG. 2, it may be seen that sealing element 20 has a slightly different shape in the undisturbed state before portions 10, 12 and 14 are secured firmly together in their operative relationship. Thus, the total width of element 20 as seen in FIG. 2 is slightly in excess of the width of spacer 12 when element 20 is in contact with surfaces 22 and 24, but no stress or force is applied in element 20 by reason of such contact. However, when screws 16 and 18, for example, are tightened in order to draw together portions 10, 12 and 14 in their normal operative relationship such as to eliminate gap 34 shown in FIG. 2, force is applied to element 20 in an amount sufficient to deform the same into the shape shown by FIG. 3. Referring to FIG. 2, it may be seen that sealing element 20 which is of annular shape, has a first annular projecting ridge or flange portion 40, a substantially cylindrical base portion 42, and a second annular projecting ridge or flange portion 44. In the preferred embodiment shown by FIGS. 1, 2 and 3, the total height $h$ of flange 40 should advantageously not exceed a value of ½ H comprising the height of flange 44 as seen in cross section and indicated appropriately in FIG. 2.

Referring to FIG. 3, it may be seen that compressive force applied to sealing element 20 when cartridge portions 10, 12 and 14 are assembled and clamped in normal operative relationship causes deformation or prestressing of the element into a shape whereby flange 44 forcibly contacts surface 24 so as to make sealing contact therewith in an annular surface area S comprising a portion of bearing surface 46. Moreover, prestressing of element 20 in the stated manner causes deformation of base portion 42 whereby normally flat bearing surface 48 thereof is deformed into a shallow curvature shown in cross section in FIG. 3 and resulting in forcible contact between a limited surface portion $s$ of surface 48 with the surface of rod 2 adjacent thereto. The force of contact between surfaces 46 and 24 resulting from prestressing of element 20 due to closure of gap 34 between portions 12 and 14 is further enhanced by application of fluid pressure within cavity 26 through passages 30 and 32 discussed hereinabove in connection with FIG. 1. Thus, pressure of fluid filling cavity 26 above element 20 may be understood to apply equally against all the surfaces and walls which the fluid contacts, including the inner surface 50 of base portion 42 and the adjacent inner surfaces of flanges 40 and 44. The surface of flange portion 40 which contacts surface 22 is substantially flat and bears substantially uniformly throughout its entire surface area against surface 22 whereby any relaxation of compressive force applied by surface 24 to element 20 is effectively prevented. Such relaxation might otherwise be induced when piston rod 2 moves toward the left as seen in FIG. 3 which would tend to cause the friction in sealing area $s$ to diminish or even unseat the sealing area S.

Due to the fact that the structural components which are stationary relative to movable piston rod 2 and not in sealing contact therewith are required to provide such clearance as may be necessary for slight variations in manufacturing tolerances or conditions of wear on the piston rod, a gap C may be seen to exist as shown in FIG. 3. Clearance gap C represents the minimum clearance gap between stationary and movable elements, but need not occur at the location shown. A minimum clearance gap normally occurs between piston rod 2 and any suitable stationary bearing surface which will prevent radial movement of the rod under radial loads. For the configuration shown in FIGS. 1, 2 and 3, particularly when the working fluid has good lubricating properties, minimum clearance would advantageously occur between elements 2 and 10 on the fluid side of seal 20 with element 10 providing the required radial bearing surface. It will be understood that the foregoing clearance permits slight but definite movement of piston rod 2 vertically as seen in FIG. 1, for example, due to compression bending, frictional couple of the attachment bearing or other effects resulting in misalignment of the piston rod relative to the cylinder with which it may be operatively related. The line of movement thus produced is indicated by line 52 in FIG. 1 which is parallel to line 28 but vertically displaced therefrom. Moreover, angular deflection of piston rod 2 sometimes may occur during normal operation when the piston is at its extreme limit of travel wherein piston rod 2 is extended to its maximum length. Angular deflection of the foregoing type is suggested by line 54 in FIG. 1, and, while normally slight, would produce imbalance of forces such as to cause fluid leakage past the dynamic seal between rod 2 and cylinder end 4 except for certain features of the novel structure disclosed herein which prevent such leakage as discussed more fully below.

FIGS. 6 and 7 show a further embodiment of the inventive principles disclosed herein as applied to a modified cross-sectional configured sealing element 61. Element 61 is a continuous ring type dynamic seal having a relatively massive base or body portion 63 and a projecting annular ridge or flange portion 65 of lesser mass than portion 63. As seen in FIG. 6, element 61 is so dimensioned with respect to cavity 26 that the sealing element undergoes deformation when cartridge portions 10, 12 and 14 are forcibly drawn together and securely held in the relationship shown by FIG. 7. However, it will be understood that the effect of compressive force applied to element 61 produces a slightly different pattern of deformation than that described for the embodiments discussed above in connection with FIGS. 1-5. Thus, element 61 is desirably fabricated from advanced-alloy stainless steels characterized by extreme hardness and toughness capable of withstanding the extremes of pressure and temperature associated with normal operation of actuators such as discussed hereinabove. The mentioned workpiece materials are often described as brittle because they deform relatively little before breaking under tension or bending loads. However, the same materials, when subjected to torsion forces, exhibit considerable ductility. The foregoing difference derives from the fact that the ratio of maximum shear stress to maximum normal stress in twisting is on the order of twice the ratio of maximum shear stress to maximum normal stress in tension or bending. The foregoing difference in workpiece material properties is effectively utilized in the specific shape and function of the structure comprising element 61. Thus, the conical shape of flange 65 results in relatively greater stiffness or resistance to deformation from the force applied by wall 24 than would result if flange 65 were precisely normal to surface 67 of body portion 63. As a result of the foregoing stiffness of flange 65, deflection of flange 65 under the stated compressive force is very limited, whereby rotation of the entire element 61 about an annular axis necessarily results from the stated force so that sealing element 61 takes the position shown in FIG. 7. The operative relationship between the elements shown in FIG. 7 results in a substantial area of intimate sealing contact S between flange 65 and wall 24, and a definite although substantially less sealing area $s$ between surfaces 67 and the cylindrical outer surface or rod 2. In the relationship shown by FIG. 7, almost the entire surface 69 of projecting portion 65 is pressed in flat and substantially uniform area contact with wall 24 and is capable of withstanding extremely high pressures, whereby rotation of element 61 in the manner described above applies torsional force which, although great, cannot bend body portion 63 of the sealing element because of its increased thickness and mass, but forces a relatively small portion of area 67 in firm, positive and substantially uniform contact with the outer surface of piston rod 2 to make sealing contact therewith. Due to the stated manner of loading in respect of the forces applied to element 61, protracted periods of service life have been found to result from the fact that no change in stress pattern and no flexing of the sealing element is permitted in the arrangement thus disclosed. Moreover, as sealing contact area S wears as a result of repeated movement of piston rod 2, the stated area enlarges and gradually involves a larger portion of total area 67 on element 61 whereby the initial sealing contact is not lost but actually increased as a result of seal wear. The foregoing is also true of the seals shown in FIGS. 1 through 5.

Figure 8:
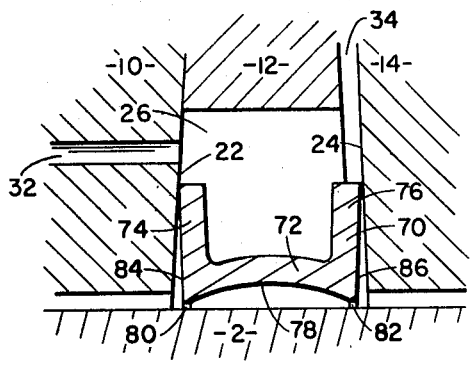
Figure 9:
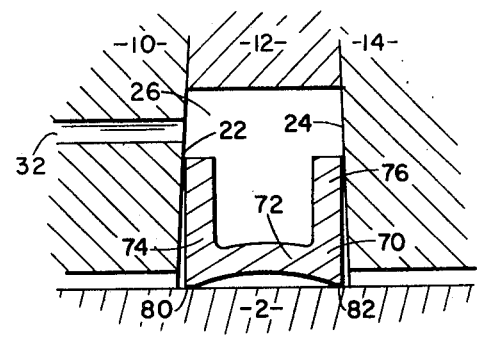

FIGS. 8 and 9 show a further embodiment of the inventive principles disclosed herein as applied to a modified cross-sectional configured sealing element 70 comprising a continuous ring seal having a cross section in the shape of a channel comprising a floor or base portion 72 integrally formed with a pair of spaced-apart annular projecting flanges 74 and 76 of substantially equal length. As seen from FIG. 8 which shows element 70 in the installed but undisturbed state without application of loads thereto, base portion 72 is formed with a permanent curvature whereby lower surface 78 defines a groove or cavity with respect to the outer cylindrical surface of piston rod 2, which is contracted by surface 78 at two relatively narrow and spaced-apart sealing areas 80 and 82. Flanges 74 and 76 are not parallel in the absence of applied external forces, but diverge slightly at their distal ends.

In further connection with the embodiment shown by FIGS. 8 and 9, it may be seen that walls 22 and 24 of cartridge portions 10 and 14 are sloped very gradually, with an oppositely corresponding slope on each side of spacer 12 respectively confronting walls 22 and 24. Thus, by reason of the mentioned slope, cavity 26 is slightly wider at the area thereof closest to the surface of rod 2 than it is at the radial outermost area of the cavity proximate the peripheral surface of spacer 12. With the mentioned elements sized and shaped in the foregoing manner, it may be seen from FIG. 9 that force applied to draw together elements 10, 12 and 14 to hold the same in close mutual contact causes deflection of flanges 74 and 76 into a condition wherein the flanges are substantially parallel to each other and the entire sealing element 70 is wedged downwardly by the action of walls 22 and 24 so that surface portions 80 and 82 are forcibly held in firm contact with the outer cylindrical surface of rod 2. Moreover, the groove or cavity defined by surface 78 between portions 80 and 82 functions to collect or retain minute particles which may occasionally be encountered within the working fluid used for operation of the piston to which rod 2 is operatively related, whereby such particles will not accelerate the rate of wear or disrupt the interference fit between surfaces 80 and 82 with piston rod 2.

Figure 10:
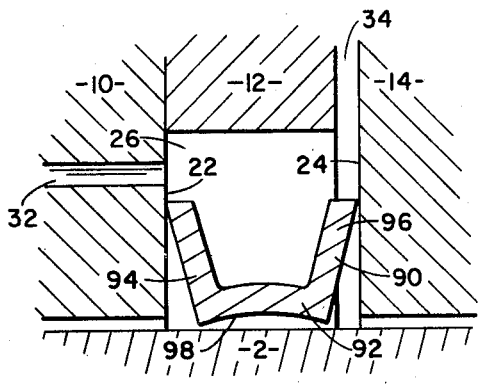
Figure 11:
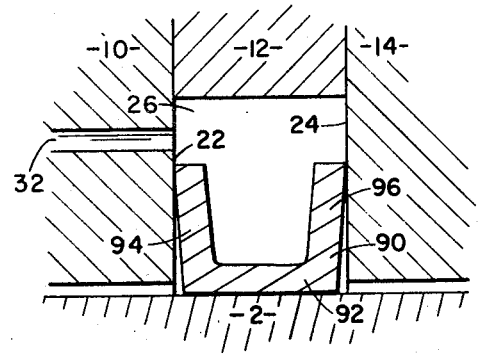

FIGS. 10 and 11 show a further embodiment of the inventive principles disclosed herein as applied to another modified cross-sectional configured sealing element 90 comprising a continuous ring seal having a cross section in the shape of a channel comprising a floor or base portion 92 integrally formed with a pair of spaced-apart annular projecting flanges 94 and 96 of substantially equal length. FIG. 10 shows sealing element 90 in the installed but undisturbed state without application of loads thereto, from which it may be seen that base portion 92 is formed with a curvature whereby lower surface 98 is biased by the material and fabrication procedures of element 90 into the arched condition shown. As in the case of the embodiment discussed above in connection with FIG. 8, it may be seen that element 90 shown in FIG. 10 is formed so that flanges 94 and 96 are not parallel in the absence of applied external forces, but diverge slightly at their distal ends. FIG. 11 shows the same structure as FIG. 10 but drawn together in operative relationship by application of force to hold cartridge portions 10, 12 and 14 in close mutual contact such as to eliminate gap 34 and causing deflection of flanges 94 and 96 by compression thereof between walls 22 and 24 of cavity 26. In the arrangement shown by FIGS. 10 and 11, walls 22 and 24 are substantially parallel and normal to the outer cylindrical surface of piston rod 2. As seen particularly from FIG. 11, application of the stated force prestresses element 90 in a manner which overcomes the inherent spring-biasing force of the workpiece material in base portion 92 whereby surface 98 becomes substantially cylindrical in shape and coincides precisely with the size and shape of the outer cylindrical surface of rod 2 resulting in an interference fit therebetween to form a seal. Moreover, although flange portions 94 and 96 of element 90 are not deflected into a condition of substantial parallelism as suggested hereinabove in regard to seal element 70 shown in FIG. 9, an interference fit sufficient to result in effective sealing between flanges 94 and 96 with walls 22 and 24, respectively, results in sealing between the stated walls and flanges. The essential difference between sealing elements 70 and 90 with respect to presence or absence of curvature in base portions 72 and 92 during the application of compressive forces by the cartridge elements 10, 12 and 14 as described, principally resides in the workpiece materials or characteristics thereof used for sealing elements 70 and 90. Thus, base portion 72 of element 70 may be heavier, or stiffer such as to resist drastic deformation under the loads applied to element 70 by walls 22 and 24 in comparison with base portion 92 or element 90, which may be rendered relatively resilient due to different materials of construction for element 90 or different heat-treating processes to produce the necessary resilience for deformation under the same or greater compression forces than those applied to element 70 in FIG. 9.

Figure 12:
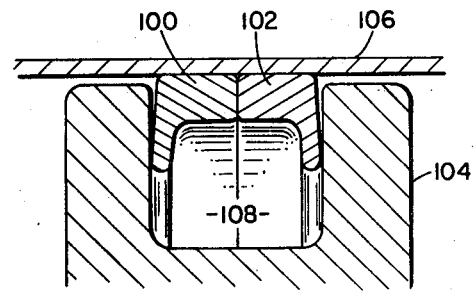

FIG. 12 shows an adaptation of the seal element 61 discussed above in regard to FIGS. 6 and 7 as applied to a piston operatively related to a cylinder. Thus, sealing elements 100 and 102 mounted on piston 104 provide dynamic sealing between the piston and the inner wall of a cylinder 106. Elements 100 and 102 are of oppositely corresponding shape and conform in all details with element 61 described in detail above. Sealing elements 100 and 102 are forcibly compressed within a cavity 108 of piston 104 and function in the same manner as element 61 to prevent passage of fluid from one side or the other of piston 104 which may be single-acting or double-acting type as well understood in the art.

OPERATION

The primary unique operation of the sealing principle is to provide a floating and unsupported with compliance in all three axes of motion. Elastic deformation of the flange portion of the seal deforms the base portion of the seal to increase interference fit (wear depth) and decrease initial wear area both of which increase the sealing life of the seal. The deformation provides a means of preventing leakage through the two principal leakage paths, the first of which is located between rod 2 and base 42 in FIG. 3, for example, and the second of which occurs between flange 44 and wall 24. The elastic deformation of seal 20 during assembly results in a minimum of unsupported and unstressed areas in the seal element, thus minimizing the possibility of permanent deformation of the seal resulting from working loads thereon. The minimization of contact area s between relatively stationary seal 20 in FIG. 3, for example, and movable rod 2 results in minimum friction, minimum wear, and improved lubrication characteristics.

From the structural details discussed hereinabove, it may be seen that the general concept in this case involves a sealing assembly which may be installed or removed in many different devices which require fluid sealing of either dynamic or static type, and is especially useful where severe temperature and pressure performance requirements are involved, since all the seals and the entire structure disclosed herein may advantageously be fabricated from metal and especially from high-temperature metals such as stainless steel or titanium. The cartridge-mounting arrangement for sealing elements 20, 60, 61, 70 and 90 as disclosed hereinabove results in very considerable versatility and improved ease of manufacture as well as performance advantages discussed in greater detail below.

Thus, all of the modifications disclosed herein involve cartridge mounted seal elements wherein the sealing member is movable within certain narrow limits in order to maintain sealing contact through changes of side load or alignment condition. As applied to the structure shown in FIG. 1, for example, it will be understood that element 20 is movable vertically within cavity 26 as suggested by line 52 and that sealing contact between surfaces S and s is maintained throughout the range of such movement. Moreover, the same areas of sealing contact are maintained during limited angular misalignment such as the condition suggested by line 54 in FIG. 1. In this connection, it has been found that such angular misalignment produces relatively little additional stress on seal 20, for example, since the space provided between base portion 42 and wall 24 in FIG. 3 permits slight but very beneficial freedom of the flange 44 to move relative to wall 24. This floating feature of the sealing arrangement in this case eliminates many detrimental effects of side and angular misalignment loads associated with seals known to the prior art, especially concentrated, nonuniform and excessive stresses on the delicate seal elements. Moreover, the shape of the seal elements such as 20, 60, 71, 70 and 90 results in high strength to prevent permanent deformation under excessive or nonsymmetrical loads without sacrificing seal bearing pressures between the surfaces required to be maintained in sealing contact. With specific regard to the radial sealing area, it is advantageous in many seal installations incorporating the concept disclosed herein that the dimension denoted S in FIG. 3, for example, not exceed more than half of the total height H of flange 44 indicated by the dimensional line in FIG. 2, because the prestressing force resulting from closure of gap 34 combined with operational stresses induced in element 20 due to angular misalignment of rod 2 may become excessive or cause permanent deformation of seal element 20, depending upon the material of construction therein. Conversely, a value for the dimension designated S in FIG. 3 less than one-fifth of the dimension indicated by H in FIG. 2 represents an approximate point at which risk of leakage may result due to insufficient sealing area. In further connection with the structure shown in FIG. 3, for example, it will be understood that compression force applied to element 20 by portions 10, 12 and 14 of cartridge 3 results in deformation of web or base portion 42 into the curved condition shown, which slightly reduces the inside diameter of sealing ring 20 at the axial location thereof substantially coinciding with flange 40 and resulting in form and intimate contact between surface 48 and the surface of rod 2 suggested by area s comprising approximately one third of the total available diametral sealing area 48. As the seal element 20 wears during normal service use, the sealing contact area s progressively increases and may extend the full width of element 20 comprising substantially all of the inner area 48 of base portion 42. Regarding angular deformation of rod 2 in the manner illustrated by broken line 54 in FIG. 1, it will be understood that element 20 associated with FIG. 1 is able to change into a slight elliptical shape in response to such nonuniform and nonsymmetrical loading whereby sealing contact with the rod circumferential surface is maintained as well as radial sealing contact between surfaces 46 and 24 of element 20 and cartridge assembly 3, respectively. Lateral or vertical movement of piston rod 2 as suggested, for example, by broken line 52 in FIG. 1, simply causes seal element 20 to slide in a radial direction across flat surfaces 22 and 24 of cartridge 3 without causing further or nonuniform deformation of element 20. In this regard, it may be noted that a high degree of surface smoothness is very important for surfaces 22 and 24 whereby firm and uniform sealing contact may be initially established and continuously maintained in the circular area suggested by the dimension designated S in FIG. 3. In this connection, it is economically very advantageous to fabricate cartridge 3 with spacer 12 as a separate portion thereof, rather than to form the cavity in two portions whereby the mass of material comprising spacer 12 is integrally formed on either of portions 10 or 14. Thus, the oppositely confronting and spaced-apart surfaces 22 and 24 may be precision machined and polished more economically if neither surface is situated within a cavity such as would result from integrally forming spacer 12 on portions 10 or 14. Moreover, the width of cavity 26 may be closely coordinated with each particular width of sealing element 20 if the thickness $t$ denoted for spacer 12 in FIG. 2 is variable by selecting any one of several spacer elements having slightly different and carefully graduated sizes. Where sealing element 20 is required to be custom fit to suit a particular cartridge 3, adjustments of size for cavity 26 resulting from slight variations in material or dimensional variations in element 20 may be quickly and much more safely achieved by exchanging parts representing various thicknesses $t$ in spacer 12. It will further be understood that all the embodiments disclosed herein may advantageously include use of pressure from the working fluid within cylinder 4 to improve the force of sealing contact by admitting some of such working fluid through passage 32 into cavity 26 shown in FIGS. 1–3, for example, and that in all the embodiments of this case, rod 2 may be rotated about its longitudinal axis 28 shown in FIG. 1 wither intermittently or continuously instead of translationally without significant effect on the sealing characteristics of the seals disclosed herein.

In addition, it may be seen that cavity 26 may, if desired, be formed integrally on cylinder 4 instead of in a separate cartridge assembly 3.

While the particular details set forth above are fully capable of attaining the objects and providing the advantages herein stated, the specific materials and method thus disclosed are merely illustrative and could be varied to produce the same results without departing from the scope of the inventive concept as defined in the appended claims.

We claim:

1. In a seal assembly between a stationary first member and a second member movable relative to said first member:
   a cartridge assembly having an annular cavity with two confronting spaced-apart annular walls,
   seal means consisting of a stiff annular metallic seal contained within said cavity, said seal having at least one annular conical flangelike ridge projecting therefrom, said ridge contacting one of said annular walls in slidable relationship therewith, and
   said cartridge assembly including force means for applying force to said one annular wall in an amount sufficient to rotate said ridge about an annular axis and deform said seal into forcible thin line contact with said second member.

2. The structure set forth in claim 1 above, wherein:
   said stiff annular metallic seal in the deformed condition due to said force is biased into a curved condition at the place of said thin line contact with said second member.

3. The structure set forth in claim 1 above, wherein:
   said seal has a substantially cylindrical midportion and a pair of generally radially outwardly projecting spaced-apart flangelike ridges adjoining said midportion, said one conical ridge contacting one of said annular walls and the other of said ridges contacting the other of said annular walls in sliding relationship therewith when said seal is deformed by said force.

4. The structure set forth in claim 3 above, wherein:
   said midportion being biased into a curved shape by said force, said curved shape tangentially contacting said second member along said thin line.

5. The structure set forth in claim 4 above, wherein:
   said seal is radially movable in its entirety with respect to said annular cavity walls.

6. The structure set forth in claim 4 above, wherein:
   said midportion is preformed with a concave groove on the radially inward surface thereof, and said force is sufficient to deform said midportion into a cylindrical contour whereby said groove disappears when said seal is in said deformed conditions.

7. An annular seal for sealing contact between a surface portion of a movable substantially cylindrical elongate shaft and a relatively stationary flat surface extending in a plane substantially normal to the longitudinal axis of said elongate shaft, said seal comprising:

a narrow midportion having a substantially cylindrical sealing surface adapted to surround the substantially cylindrical surface of said shaft, and at least one annular conical flange projecting in a generally radial outward direction from said midportion, said flange being adapted to contact said flat surface in forcible sealing and sliding relationship therewith, and the force of said contact with said flat surface deforming said midportion and forcing a narrow portion of said sealing surface into thin line contact with said surface portion of said shaft.

8. The structure set forth in claim 7 above, further including:

a second annular flange projecting in a generally radial direction outwardly from said midportion and spaced apart from said one flange, said second annular flange being of lesser projecting length than said one flange.

9. In a dynamic seal between a translationally movable shaft and a relatively stationary wall surrounding said shaft:

a substantially round stiff metallic seal of generally U-shaped radial cross section having two upstanding radially outwardly extending flanges and a substantially flat base portion in the unstressed condition, and force means mounted on said wall for rotating said upstanding flanges toward each other with sufficient force to deform said base portion into a slightly curved shape making forcible thin line contact between a narrow surface portion of said curved base portion and the surface of said shaft.

10. The structure set forth in claim 9 above, wherein:

said force means comprises cavity means for containing said seal in translationally movable relationship with said shaft, said translational movement being in a direction substantially normal to the longitudinal axis of said elongate shaft.

11. The structure set forth in claim 9 above, wherein:

one of said upstanding flanges is of lesser height than the other of said flanges, whereby said curved shape is unsymmetrical and said narrow portion is offset from the center of said U-shaped cross-sectional configuration of said seal.

12. The structure set forth in claim 9 above, wherein:

said force means comprises a pair of confronting spaced-apart annular walls, each of said walls being in contact with a separate one of said upstanding flanges.

13. In a seal assembly between two coaxially disposed and relatively movable machine elements having a clearance gap therebetween:

a stiff metallic sealing ring having a substantially cylindrical surface portion making substantially uniform surface area contact with one of said machine elements and in interference fitting relationship therewith when said ring is in the undeformed state, said ring having flange means including at least one flange formed thereon and making forceful and slidingly movable contact with the other of said machine elements in sealing relationship therewith and with sufficient force to rotate said flange about an annular axis and deform said surface portion into noncylindricality and nonuniform surface area contact with said one machine element.

14. The structure set forth in claim 13 above, further including:

a cartridge for containing said stiff metallic sealing ring, connection means for releasably connecting said cartridge to said other machine element, and said cartridge containing an annular cavity having two spaced-apart and substantially parallel walls, said cartridge further including a removable flat spacer element for adjustably varying the distance between said walls whereby the force of contact of said flange may be adjustably established at a predetermined amount by removing and replacing said spacer element with another spacer element having different thickness than said removable flat spacer element.

15. A seal assembly between a cylinder housing and a coaxially disposed piston shaft translationally movable within said cylinder housing, said piston shaft having a peripheral clearance gap relative to said cylinder housing, said assembly comprising:

a cartridge having three ring-shaped elements with substantially parallel flat surfaces, each of said elements having substantially uniform thickness, said ring-shaped elements consisting of a retainer element, a compression element, and a spacer element sandwiched between said retainer and compression elements, the inner diameter of said ring-shaped spacer element being larger than the inner diameters of said retainer and compression elements so that an annular cavity with substantially parallel sidewalls is formed when said three ring-shaped elements are assembled in operative relationship, holding means for releasably holding said three ring-shaped elements with said flat surfaces in substantially continuous area contact and securing said cartridge to said cylinder housing, and at least one resilient circular seal secured within said annular cavity in forcible and sliding contact with said sidewalls and deformed by said contact into close, uniform circumferential contact with said piston shaft when said three ring-shaped elements are assembled in operative relationship, the force of said contact with said sidewalls depending upon the thickness of said spacer element.

16. The structure set forth in claim 15 above, wherein:

said circular seal is sized to permit sliding movement thereof within said cavity in a radial direction.

* * * * *